United States Patent [19]
Ecktman

[11] Patent Number: 5,201,624
[45] Date of Patent: Apr. 13, 1993

[54] ONE-PIECE FASTENER ANCHOR

[75] Inventor: Jack D. Ecktman, Indianapolis, Ind.

[73] Assignee: Bridgestone/Firestone, Inc., Akron, Ohio

[21] Appl. No.: 869,974

[22] Filed: Apr. 16, 1992

[51] Int. Cl.⁵ .................. F16B 37/04; F16B 15/06
[52] U.S. Cl. ..................... 411/180; 411/82; 411/456; 411/930
[58] Field of Search ............... 411/82, 179, 180, 181, 411/182, 178, 456, 930

[56] References Cited

U.S. PATENT DOCUMENTS

| | | |
|---|---|---|
| 2,836,214 | 5/1958 | Rapata . |
| 2,984,698 | 5/1961 | Strauss .................. 174/138 |
| 3,187,424 | 6/1965 | Dougle et al. .......... 411/181 X |
| 3,187,796 | 6/1965 | Dougle ................... 411/181 X |
| 3,756,116 | 9/1973 | Schuplin . |
| 3,803,973 | 4/1974 | Rapata . |
| 3,830,134 | 8/1974 | Erickson . |
| 4,077,300 | 3/1978 | Yoda . |
| 4,787,606 | 11/1988 | Geno et al. ............. 267/64.27 |
| 4,842,462 | 6/1989 | Tildesley ................ 411/180 |
| 4,902,180 | 2/1990 | Gauron ................... 411/82 |
| 4,941,788 | 7/1990 | Highfield ............... 411/180 X |

FOREIGN PATENT DOCUMENTS 2461142  3/1981  France .................. 411/180

Primary Examiner—Neill R. Wilson
Attorney, Agent, or Firm—Ernst H. Ruf

[57] ABSTRACT

An anchor, preferably formed of metal, has at least one flat side and is adapted to be forcefully inserted axially into a complementary shaped aperture formed in an object made of a softer material than the anchor, such as plastic. The anchor is adapted to receive an attachment fastener in a central threaded opening formed in the anchor, after the anchor is forcefully seated in the aperture of the object. A plurality of angled barbs extend outwardly from the body and cut into the object to resist pullout of the anchor once seated in the object, with the flat side resisting rotation of the anchor with respect to the body. The anchor may be formed with flat corner areas which align with rounded corners of the object aperture. In the alternative, generally circular stress relief areas are formed in the corners of the aperture which align with shape square corners of the anchor. The outer dimensions of the anchor body sides are slightly less than the internal dimension of aperture but the widths of the barbs are greater than the corresponding widths of the aperture.

21 Claims, 3 Drawing Sheets

ONE-PIECE FASTENER ANCHOR

BACKGROUND OF THE INVENTION

1. Technical Field

The invention relates to anchors which are intended for installation in bodies of a softer material than the anchors, such as plastic, for subsequently receiving an attachment fastener for securing the body to another component. More particularly, the invention relates to such an anchor which has increased resistance to axial pullout and to rotation once inserted into an object.

2. Background Information

Various types of anchors have been developed which are mounted in objects or various types of bodies for securing the object or body to another component, or for securing other components to the object, by means of a fastener which extends into a threaded opening formed in the center of the anchor. Most of these anchors are used in objects that are formed of materials which do not provide sufficient resistance for holding a fastener in position without the use of such an anchor, in order to mount the object on a supporting structure or the like. Most known anchors when used with plastic components or similar soft materials, are molded into the object when the object is formed, and are provided with some type of knurled or fluted surface to secure it in position. Although some of these prior art anchors perform satisfactory, they require that they be inserted into the plastic object or body during molding, or they are secured in position by sonic welding or with an adhesive, all of which increase the cost of manufacture. Likewise, most of these anchors are of a rounded configuration and are subject to rotation in the object or body in which they are mounted, when an excessively large torquing force is applied thereto, especially when the attachment fastener is inserted and screwed therein.

Other types of anchors are adapted to be snapfitted through openings formed in an object, as opposed to insertion into a solid body. It is more difficult to retain the anchor in an aperture formed in a solid body in contrast to those anchors which extend through openings formed in a plate or other support.

Examples of known prior art anchors are shown in the following patents.

U.S. Pat. No. 2,836,214 discloses a plastic insert or anchor having a generally rectangular cross-sectional configuration so that when it is inserted into an opening it will lock itself in position. It is provided with a plurality of sloped surfaces which resist pullout once inserted into the opening of the plate.

U.S. Pat. No. 2,984,698 discloses an anchor grommet having a square surface to prevent rotation once it is inserted into a hole in a relatively flat plate. The tapered surfaces resist outward axial movement once inserted into the hole. It also is provided with a circular central opening for receiving a mounting bolt or other fastener therein.

U.S. Pat. No. 3,756,116 discloses another plastic grommet or anchor insert is adapted to be inserted through an opening in a flat plate and which has protuberances on the sidewalls thereof to prevent extraction of the insert once inserted through the plate opening.

U.S. Pat. No. 3,803,973 discloses a plastic insert or anchor that has a generally square configuration and has tapered sidewall structures to hold the insert in a complementary shaped opening in a plate once it is inserted therein. This anchor also has a circular central opening for receiving an attachment fastener.

U.S. Pat. No. 3,830,134 discloses another plastic anchor generally square in configuration, that once inserted into a complementary shaped opening in a plate, it locks itself in position due to the resilience of the material as opposed to the use of ribs or barbs. This anchor also is adapted to receive a fastener through a central opening thereof.

U.S. Pat. No. 4,077,300 discloses a plastic grommet having a square outer configuration and a central hole for receiving a fastener. Projections formed on the outer surface function as retaining members after the grommet is inserted through a complementary shaped hole in the mounting plate.

U.S. Pat. No. 4,842,462 is believed to be the closest known fastening anchor or insert to the present invention. It discloses a body that is made of metal having a flat to prevent rotation thereof after mounting in an object. However, this insert must be either molded into the plastic object, or sonically or thermally welded into the plastic after molding. It is not forcibly pushed into the object after molding as is the anchor of the present invention, and it would require additional equipment and manufacturing operations to install the same.

Accordingly, none of the known prior art anchors are adapted to be forcibly inserted into an opening of a solid body formed of a softer material than the anchor, and which is able to resist greater axial pullout forces and rotational forces once forcibly inserted into position in the body.

SUMMARY OF THE INVENTION

Objectives of the invention include providing an improved anchor which is able to be forcibly pushed into a solid plastic body or other object after the object has been molded, which increases the torque capability of the anchor and increases its axial pullout resistance.

A still further objective is to provide such an anchor which is formed with at least one flat side surface to resist rotation after insertion into an object which is formed of a softer material than that of the anchor, which enables barbs, that are formed integrally with the anchor body, to cut into the softer material of the object, and secure the anchor in position; and in which the angular orientation of the barbs resist pullout of the anchor from the body, while facilitating the insertion of the anchor into a complementary shaped aperture of the object.

A further objective of the invention is to provide such an anchor and aperture combination, in which the corners of the aperture that is formed in a plastic body are provided with stress relief areas which reduce cracking of the plastic upon forceful insertion of the anchor into the body aperture.

Another objective of the invention is to provide an anchor and mating aperture combination in which the corner areas of the anchor are flat surfaces which align with generally rounded corners of the aperture to facilitate the insertion of the anchor therein.

A further objective of the invention is to provide such an anchor which preferably has a body which is square in cross-sectional configuration and which has a plurality of axially spaced barbs on all four sides of the anchor body, which barbs have an overall width slightly greater than the width of the aperture into which the anchor is inserted to enable the barbs to cut into the softer material of the body surrounding the aperture; and in which the body of the anchor is slightly smaller than that of the aperture enabling the anchor to be force-fitted into the aperture with only the barbs cutting through the surrounding material defining the aperture.

A still further objective of the invention is to provide such an improved anchor which is relatively easy to install into an object after the object has been removed from its mold, without the use of any bonding material or the application of heat or sonic energy thereto, thus reducing the cost of the anchor and of the manpower and equipment required to insert the anchor into an object.

These objectives and advantages are obtained by the improved anchor of the invention, the general nature of which may be stated as including a one-piece anchor adapted to be forcibly inserted in an axial direction into a complementary shaped aperture of an object formed of a softer material than said anchor, said anchor having a body formed with at least one flat side and having a plurality of retaining barbs formed integrally on said body and extending in an outwardly inclined direction from said body in a direction complementary to the direction of insertion of the anchor into the aperture of the object to facilitate the insertion of the anchor into said aperture, said barbs being adapted to cut into the softer material of the object adjacent the aperture when forcefully inserted therein to resist axial pullout of the anchor from the aperture and with the flat side resisting rotation of the anchor within said aperture; and a fastener receiving aperture extending into the body for receiving a fastener therein after the anchor has been installed in said object.

BRIEF DESCRIPTION OF THE DRAWINGS

Preferred embodiments of the invention, illustrative of the best modes in which applicant has contemplated applying the principles, are set forth in the following description and are shown in the drawings and are particularly and distinctly pointed out and set forth in the appended claims.

Similar numerals refer to similar parts throughout the drawings.

DESCRIPTION OF THE PREFERRED EMBODIMENTS

Figure 1:
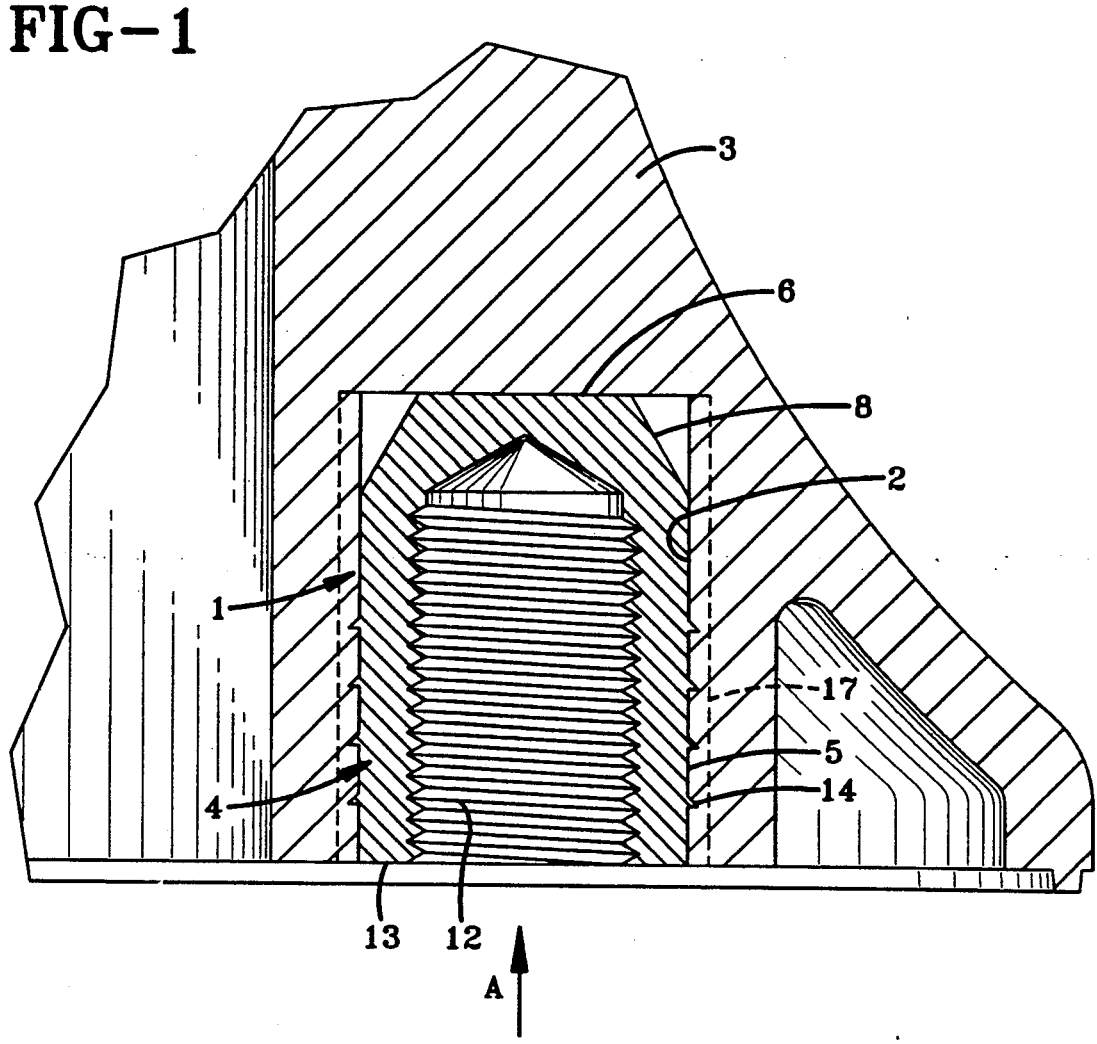
FIG. 1 is an enlarged fragmentary sectional view showing the mounting of the anchor in a solid object for securing the same to a supporting structure.
Figure 2A:
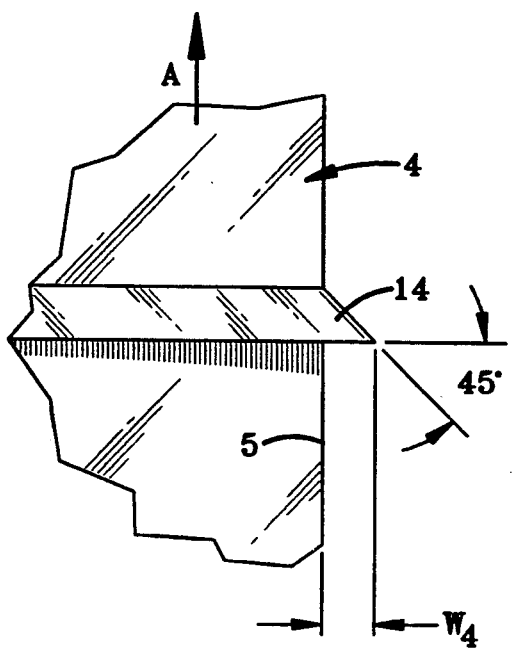
FIG. 2A is an enlarged fragmentary view of one of the retaining barbs of the anchor.
Figure 2:
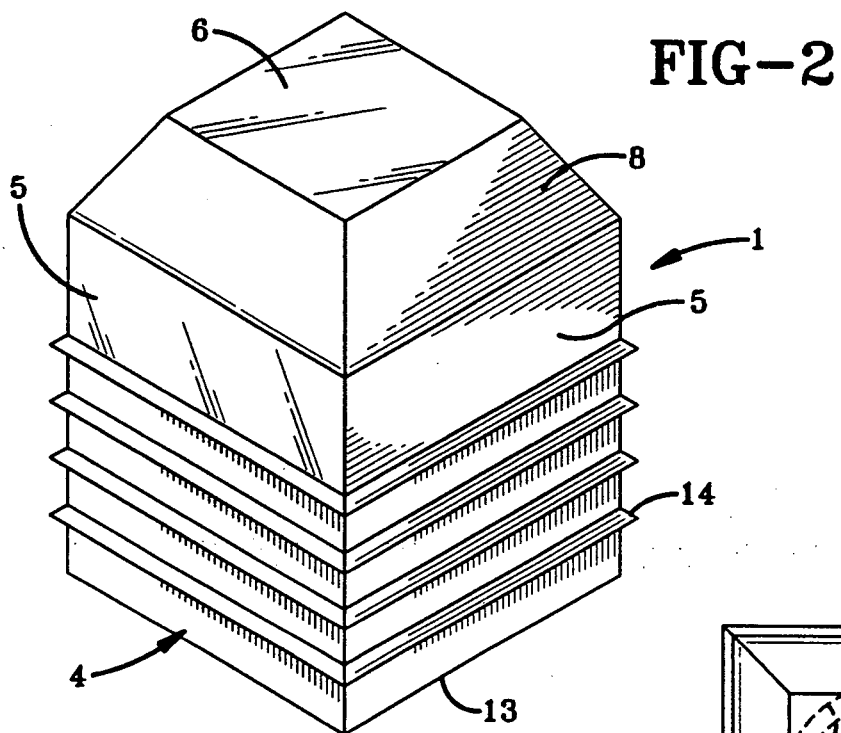
FIG. 2 is an enlarged perspective view of a first embodiment of the anchor.
Figure 3:
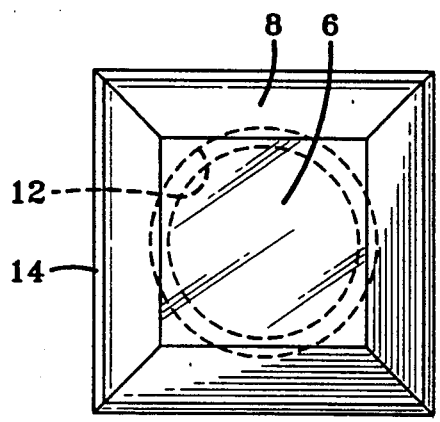
FIG. 3 is a top plan view of FIG. 2.
Figure 4:
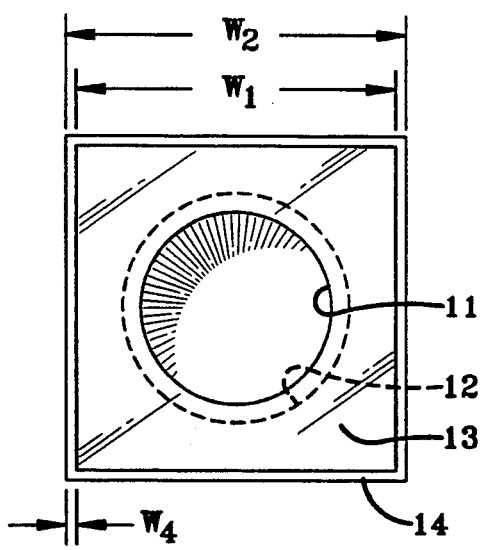
FIG. 4 is a bottom plan view of FIG. 2.

A first embodiment of the anchor of the invention is indicated generally at 1, and is shown particularly in FIGS. 2-4. Anchor 1 is shown in FIG. 1 mounted within an aperture 2 of a solid object 3. Object 3 as shown in FIG. 1, usually is formed of a plastic material, and one example of an object with which the anchor is intended to be used is the base or piston portion of a pneumatic air spring of the type shown in U.S. Pat. Nos. 4,762,308, 4,784,376, 4,787,606 and 4,852,861, which patents are assigned to the same assignee as that of the present application. However, the use of anchor 1 need not be limited to the solid body of an air spring, but can be used in other types of solid bodies or objects so long as the material surrounding the aperture in the object is softer than the material from which anchor 1 is formed. The term solid body as used throughout, refers to an object in which the anchor is fully inserted therein without extending through the object, such as occurs with prior art anchors of the type described in the previous referenced patents, wherein the anchor extends through an aperture formed in a flat plate or the like.

Referring to FIGS. 2-4, anchor 1 includes a body 4, preferably having a rectangular or square configuration formed by four flat sides 5 which connect with a flat inner end surface 6 by chamfered surfaces 8, which form a truncated end configuration on the body. A central aperture 11 provided with a helical thread 12, is formed in body 4 and extends inwardly from a flat outer end surface 13 toward inner end surface 6. Aperture 11 is adapted to receive a usual type of fastening screw or bolt (not shown) for mounting object 3 to a supporting structure or the like.

A plurality of barbs 14 are formed integrally on sides 5 of body 4 and extend generally throughout the widths thereof and completely surround anchor 1 in an axial spaced relationship. The individual barbs on each side generally lie in a common plane transverse to the axis of anchor body 4 and are spaced axially along the body. Barbs 14 preferably extend outwardly downwardly at an angle of approximately 45° as shown in FIG. 2A, in a complementary direction with respect to the direction of insertion of the anchor into aperture 2 as shown by arrow A, FIG. 1. In the preferred embodiments, three layers of axially spaced barbs are formed on body 4.

Figure 5:
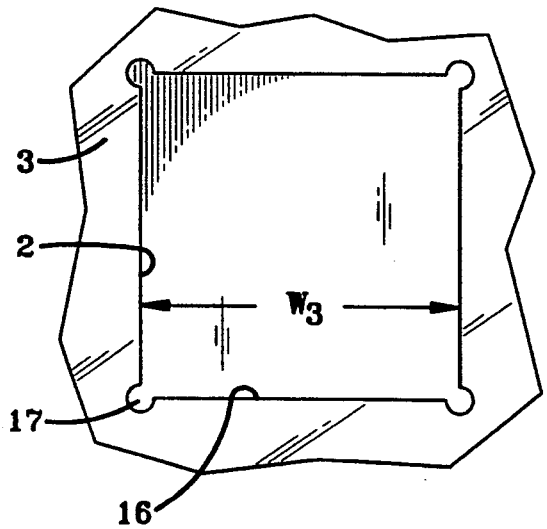
FIG. 5 is a fragmentary view showing the aperture in an object in which the anchor of FIGS. 2-4 will be seated.

FIG. 5 shows the aperture 2 that is formed in object 3, as having the same generally square or rectangular configuration as body 4 of anchor 1. Aperture 2 is defined by flat sides 16 which are complementary to anchor sides 5. Aperture 2 further includes a generally circular cutout area 17 at each of the corners of sides 16, which areas provide stress relief to reduce cracking of object 3 when anchor 1 is forcibly, axially inserted into the aperture.

In accordance with the invention and as shown in FIG. 4, the width of body 4 and in particular sides 5 thereof, indicated as W, is slightly less than the corresponding width of aperture 2 represented by $W_3$ (FIG. 5). However, the overall width presented by barbs 5 indicated at $W_2$, will be slightly greater than the corresponding aperture width $W_3$. It has been found that to achieve the best results, the width $W_2$ of barbs 14 is such so that barbs 14 will extend outwardly beyond body sides 5 a distance of approximately 0.02 inches as shown by $W_4$, and that the aperture width $W_3$ will be between 0.001 and 0.005 inches wider than the width $W_1$ of anchor body 4. The overall height of anchor 1 may be approximately one inch for many applications. This particular configuration has proved to be satisfactory and will provide an anchor with increased axial pullout resistance and increased resistance to rotation than believed possible with known existing anchors adapted for insertion or placement within the aperture of a solid object.

Anchor 1 is inserted easily into aperture 2 of body 4 by an axial movement (arrow A, FIG. 1), by use of a press or similar machine. Upon being inserted into object 3, chamfered surfaces 8 facilitate the centering and sliding movement of body 4 into aperture 2. The taper of barbs 14 further facilitates this axial inward movement yet provides a strong resistance to its outward movement once fully seated in aperture 2 as shown in FIG. 1. Object 3 usually will be formed of a plastic material, although it could be formed of a soft metal so long as anchor 1 is of a harder material. In a preferred example, anchor 4 is formed of a cold rolled steel such as 1020, and object 3 formed of a high strength molded plastic. In another example, anchor 1 could be formed of cast aluminum, bronze, or brass depending upon the particular hardness of the object into which it is to be inserted. Barbs 14 will be formed integrally with body 4, either by machining, casting or other metal working procedure used during the formation of anchor 1, depending upon the particular material from which anchor 1 is formed.

Figure 6:
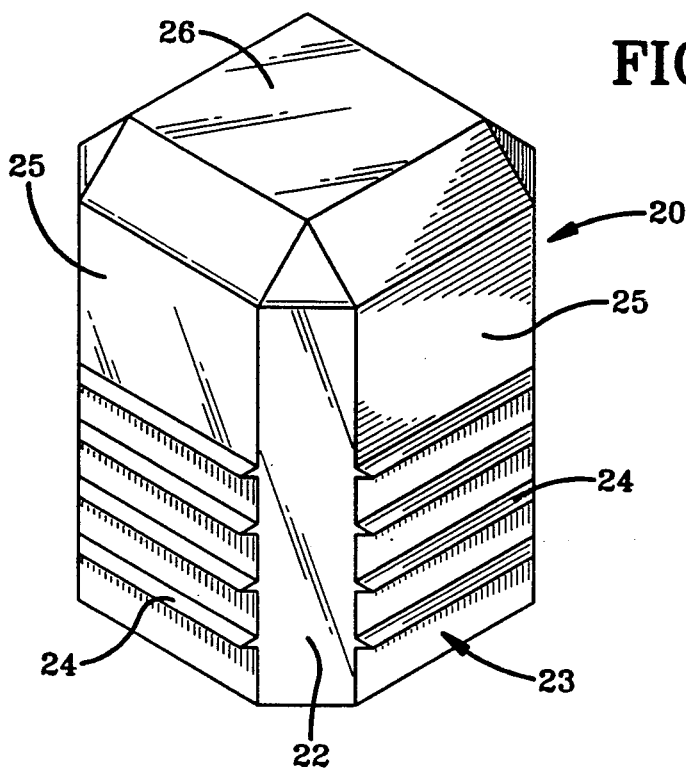
FIG. 6 is an enlarged perspective view of a second embodiment of the anchor.
Figure 7:
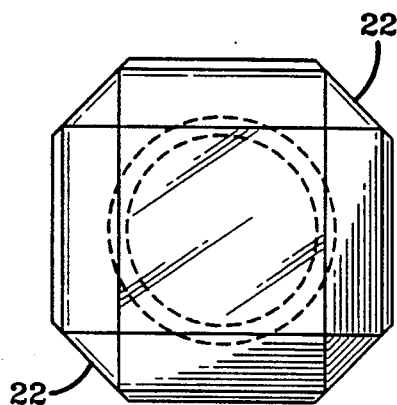
FIG. 7 is a top plan view of the anchor of FIG. 6.
Figure 8:
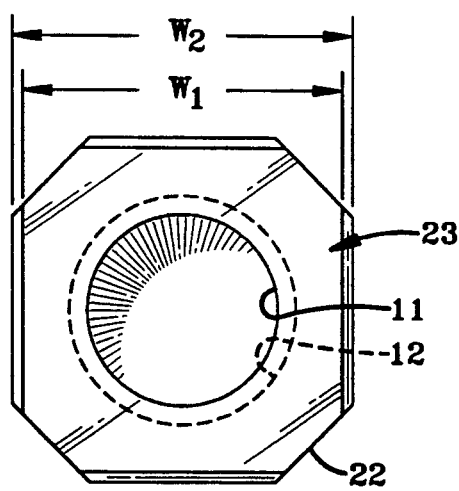
FIG. 8 is a bottom plan view of FIG. 6.

A modified form of the improved anchor is indicated generally at 20, and is shown in FIGS. 6–8. Anchor 20 is similar in most respects to anchor 1 except that the corner areas thereof are flat surfaces 22 which extend generally throughout the axial length of its body 23, with the securing barbs 24 extending throughout the length of the flat side surfaces 25. The inner end 26 of body 23 may be truncated in the same general configuration as the truncated inner end of body 4.

Figure 9:
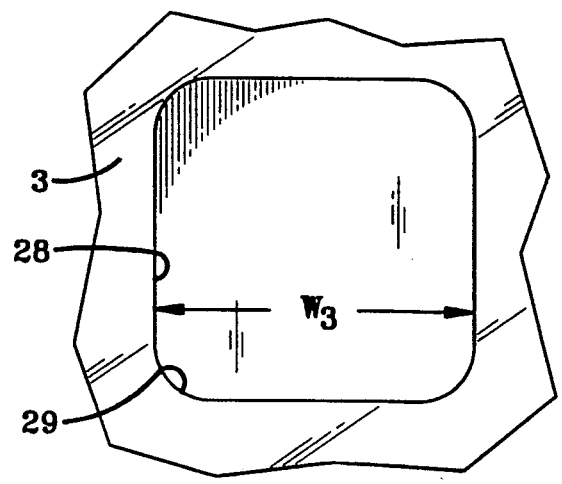
FIG. 9 is a fragmentary view showing the aperture in an object in which the anchor of FIGS. 6-8 will be seated.

When body 23 is configured as shown in FIG. 6, object aperture 28 (FIG. 9) will have the same dimensional relationship to body 25 as previously discussed with respect to body 4 and aperture 2, that is, body 25 is smaller than aperture 28, with the width of the barbs being greater than aperture width $W_3$. The corner areas 29 of aperture 28 preferably will be rounded and will align with flat corner areas 22 of body 25 to reduce cracking of object 3 at the corner areas where excessive stress will be encountered upon the forceful insertion of anchor 20 therein. Anchor 20 is installed in the same manner as anchor 1 so that barbs 24 will cut into the softer material of object 3 surrounding aperture 28.

In summary, anchors 1 and 20 consist of a body having one or more flat surfaces with one or more barbs machined, crimped, swaged or molded integrally with the body to form a one-piece unitary member which is adapted to be used for insertion into a complementary shaped aperture provided in an object, which object is formed of a softer material than that of the anchor. For most applications, object 3 will be formed of plastic and anchors 1 and 20 will be formed of metal. The anchor is forced into the complementary aperture via some mechanical mechanism and the shape and slope of the barbs will allow the entry of the anchor into the material of the receiving object. Once seated in the aperture, the barbs resist removal of the anchor from within the aperture and the flat sides of the anchor provide a mechanical resistance to torque by abutment against complementary shaped flat sides of the aperture. This torque resistance far exceeds that provided by conventional circular inserts and anchors. Furthermore, the aperture that is formed in object 3 will be provided with stress relief areas in the corners thereof to reduce cracking upon the forceful axial insertion of the anchor into the aperture. Modified anchor 20 has been found useful when the anchor is installed near the outer portion of an object where space is at a premium.

Although anchor body 4 is described throughout as having a rectangular or square configuration, it may have other configurations without affecting the concept of the invention so long as it is provided with a flat side. For example, body 4 could have a D-shaped configuration, two flat sides connected by two arcuate sides or the like.

Accordingly, the anchor of the present invention is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved anchor is constructed and used, the characteristics of the construction, and the advantageous, new and useful results obtained; the new and useful structures, devices, elements, arrangements, parts and combinations, are set forth in the appended claims.

I claim:

1. A one-piece fastener anchor adapted to be forcefully inserted into a complementary shaped aperture of an object that is formed of a softer material than said anchor, said anchor including a body formed with at least one flat side and having a plurality of axially spaced retaining barbs formed integrally on said body and extending generally throughout the width of said flat and in an outwardly inclined direction from said body in a direction complementary to the direction of insertion of the anchor into the aperture of the object to facilitate the insertion of said anchor into said aperture, said barbs being adapted to cut into the softer material of the object adjacent the aperture when forcefully inserted therein to resist pullout of the anchor from the aperture and with the flat side resisting rotation of the anchor within said aperture; and a fastener receiving aperture extending into the body of the anchor for receiving a fastener therein after the anchor has been installed in said object.

2. The anchor defined in claim 1 in which the anchor body is generally rectangular having four flat sides; and in which a plurality of the barbs are formed on each of the flat sides and lie in common transverse planes extending through said body.

3. The anchor defined in claim 2 in which the body has opposed inner and outer ends; and in which the inner end has a generally truncated chamfered configuration; and in which the outer end is generally flat.

4. The anchor defined in claim 2 in which the flat sides of the body are joined by flat corner areas free of barbs.

5. The anchor defined in claim 1 in which the fastener receiving aperture is internally threaded and extends generally throughout the length of the body.

6. The anchor defined in claim 1 in which the barbs extend outwardly from the body at an angle of approximately 45°.

7. The anchor defined in claim 1 in which the barbs extend beyond the body approximately 0.02 inches.

8. The anchor defined in claim 1 in which at least three axially spaced barbs are formed on the body and extend generally throughout the width of the flat side thereof.

9. The anchor defined in claim 1 in which the body and barbs are formed of metal.

10. In combination, an object formed with an attachment aperture having at least one flat side, and a one-piece fastener anchor for a forceful axial insertion into said attachment aperture, said anchor being formed of a harder material than the material of the object surrounding the attachment aperture, said anchor further having a body being generally complementary in its outer shape to the attachment aperture and of a slightly smaller outer dimension to facilitate its axial insertion into said aperture, and having at least one flat side; a plurality of axially spaced barbs formed integral with the anchor body and extending generally throughout the width of the said flat side and in an outwardly inclined direction from said body in a direction complementary to the direction of insertion of the anchor into the aperture, whereby said barbs cut into the softer material of the object adjacent the aperture when forcefully inserted therein to resist pullout of the anchor from the aperture and with the flat side resisting rotation of the anchor within said aperture; and means formed on the anchor body for securing the object onto a supporting structure after the anchor has been seated in said aperture.

11. The combination defined in claim 10 in which the anchor body is generally rectangular having four flat sides; and in which a plurality of the barbs are formed on each of the flat sides and lie in common transverse planes extending through said body.

12. The combination defined in claim 11 in which the attachment aperture is rectangular having four corners; and in which certain of the corners have generally circular cutouts to provide stress relief areas.

13. The combination defined in claim 11 in which the flat sides of the body are joined by flat corner areas free of barbs.

14. The combination defined in claim 13 in which the attachment aperture is generally rectangular having four corners; and in which certain of the corners are rounded.

15. The combination defined in claim 11 in which the attachment aperture is defined by flat sides; and in which said attachment aperture sides are approximately 0.001 to 0.005 inches wider than the corresponding sides of the anchor.

16. The combination defined in claim 15 in which the barbs extend beyond the body approximately 0.02 inches.

17. The combination defined in claim 10 in which the anchor is formed of metal and the object is formed of plastic.

18. The combination defined in claim 10 in which the securing means is a fastener receiving aperture extending into the body for receiving a fastener therein after the anchor has been installed in said object.

19. The combination defined in claim 18 in which the fastener receiving aperture is internally threaded and extends generally throughout the length of the body.

20. A one-piece fastener anchor adapted to be forcefully inserted into a complementary shaped aperture of an object that is formed of a softer material than said anchor, said anchor including a generally rectangular body formed with four flat sides and having a plurality of retaining barbs formed integrally on each of said flat sides and lying in common transverse planes extending through said body, and extending in an outwardly inclined direction from said body in a direction complementary to the direction of insertion of the anchor into the aperture of the object to facilitate the insertion of said anchor into said aperture, said barbs being adapted to cut into the softer material of the object adjacent the aperture when forcefully inserted therein to resist pullout of the anchor from the aperture and with the flat sides resisting rotation of the anchor within said aperture; and a fastener receiving aperture extending into the body of the anchor for receiving a fastener therein after the anchor has been installed in said object.

21. In combination, an object formed with a generally rectangular attachment aperture, and a one-piece anchor for a forceful axial insertion into said attachment aperture, said anchor being formed of a harder material than the material of the object surrounding the attachment aperture, said anchor further having a generally rectangular body being generally complementary in its outer shape to the attachment aperture and of a slightly smaller outer dimension to facilitate its axial insertion into said aperture, and having four flat sides with a plurality of barbs formed integral with the anchor body on each of the flat sides and lying in common transverse planes extending through said body, said barbs extending in an outwardly inclined direction from said body in a direction complementary to the direction of insertion of the anchor into the aperture.

* * * * *